(12) United States Patent
Yamamoto

(10) Patent No.: US 11,997,388 B2
(45) Date of Patent: May 28, 2024

(54) IMAGE OBTAINING MEANS FOR FINDING AN OBJECT

(71) Applicant: TOYOTA MOTOR EUROPE, Brussels (BE)

(72) Inventor: Kazuya Yamamoto, Brussels (BE)

(73) Assignee: TOYOTA MOTOR EUROPE, Brussels (BE)

( * ) Notice: Subject to any disclaimer, the term of this patent is extended or adjusted under 35 U.S.C. 154(b) by 273 days.

(21) Appl. No.: 17/608,608

(22) PCT Filed: May 3, 2019

(86) PCT No.: PCT/EP2019/061451
§ 371 (c)(1),
(2) Date: Nov. 3, 2021

(87) PCT Pub. No.: WO2020/224752
PCT Pub. Date: Nov. 12, 2020

(65) Prior Publication Data
US 2022/0232168 A1    Jul. 21, 2022

(51) Int. Cl.
*H04N 23/695* (2023.01)
*G06T 7/246* (2017.01)

(52) U.S. Cl.
CPC ........... *H04N 23/695* (2023.01); *G06T 7/248* (2017.01); *G06T 2207/20216* (2013.01)

(58) Field of Classification Search
CPC ...... H04N 23/695; H04N 7/183; G06T 7/248; G06T 2207/20216; G06V 20/52
See application file for complete search history.

(56) References Cited

U.S. PATENT DOCUMENTS

| 6,437,819 B1 | 8/2002 | Loveland | |
|---|---|---|---|
| 2010/0007736 A1* | 1/2010 | Mori | H04N 23/62 348/155 |

(Continued)

FOREIGN PATENT DOCUMENTS

| CN | 102638675 B | 1/2015 |
|---|---|---|
| CN | 105205467 A | 12/2015 |

(Continued)

OTHER PUBLICATIONS

May 29, 2023 Office Action issued in Chinese Patent Application No. 201980096040.1.

(Continued)

*Primary Examiner* — Gevell V Selby
(74) *Attorney, Agent, or Firm* — Oliff PLC

(57) ABSTRACT

A tracking system and an image obtaining means include: a processor; a memory module communicatively coupled to the processor; a pan-tilt camera including angle sensors communicatively coupled to the processor for tracking a predetermined object and sensing the coordinates of the pan-tilt camera; and machine readable instructions stored in the memory module that cause the image obtaining means to determine whether the predetermined object becomes lost within the image periphery of the image data; and if the predetermined object becomes lost, record the coordinates of the camera in the memory module where the predetermined has been tracked for the last time.

8 Claims, 4 Drawing Sheets

(56) References Cited

U.S. PATENT DOCUMENTS

| | | | | |
|---|---|---|---|---|
| 2011/0310219 A1* | 12/2011 | Kim | ................... | H04N 23/698 |
| | | | | 348/36 |
| 2013/0278778 A1* | 10/2013 | Kagei | ................. | H04N 23/695 |
| | | | | 348/169 |
| 2016/0084932 A1* | 3/2016 | Ito | ......................... | H04N 23/69 |
| | | | | 348/169 |

FOREIGN PATENT DOCUMENTS

| | | |
|---|---|---|
| EP | 2117232 A1 | 11/2009 |
| EP | 3024227 A1 | 5/2016 |
| EP | 3367353 A1 | 8/2018 |
| JP | 2018-073129 A | 5/2018 |

OTHER PUBLICATIONS

Jan. 27, 2020 International Search Report issued in International Patent Application No. PCT/EP2019/061451.
Jan. 27, 2020 Written Opinion issued in International Patent Application No. PCT/EP2019/061451.
English-language Translation dated Sep. 20, 2022 Office Action issued in Japanese Patent Application No. 2021-565041.

* cited by examiner

| No. | Pan angle | Tilt angle |
|---|---|---|
| ① | 92 | 0 |
| ② | 87 | -3 |
| ③ | -113 | 10 |
| ③ | 88 | 5 |

FIG.5

| No. | Pan angle | Tilt angle | Weight |
|---|---|---|---|
| ① | 89 | 1 | 3 |
| ② | -113 | 10 | 1 |

FIG.6

IMAGE OBTAINING MEANS FOR FINDING AN OBJECT

FIELD OF THE DISCLOSURE

The present disclosure relates to a camera enabled device for finding an object. More particularly, the present disclosure relates to a camera enabled device for finding one or multiple individuals by learning the entrances and exits of an enclosed space.

BACKGROUND OF THE DISCLOSURE

Monitoring systems that are adapted to track an individual have been available in recent years. These systems enable an operator to select a target individual and instruct a monitoring system to conduct autonomous monitoring of that individual.

According to some implementations, a system of cameras for autonomous monitoring may be implemented to track an individual of interest in a defined space. The system of cameras may be configured to "hand off" monitoring the target individual to ensure continuous monitoring of the individual until they leave the defined space. For example, U.S. Pat. No. 6,437,819 B1 discloses an automated video person tracking system.

SUMMARY OF THE DISCLOSURE

The inventors have recognized that there is a need for an improved automated tracking means and system. Therefore, an image obtaining means is provided. An image obtaining means comprising: a processor; a memory module communicatively coupled to the processor; a pan-tilt camera including angle sensors communicatively coupled to the processor for tracking a predetermined object and sensing the coordinates of the pan-tilt camera; and machine readable instructions stored in the memory module. The machine readable instructions can cause the image obtaining means to perform at least the following when executed by the processor: receiving, from the camera, image data including image periphery; determining whether a predetermined moveable object is present based on the image data; if the predetermined object is present, tracking the predetermined object with the pan-tilt camera; determining whether the predetermined object becomes lost within the image periphery of the image data; and if the predetermined object becomes lost, record the coordinates of the camera in the memory module where the predetermined has been tracked for the last time.

Embodiments the present disclosure may enable tracking of an object of interest or predetermined object and learning the entrances and exits of a defined space. Learning the entrances and exits of the defined space facilitates the image obtaining means' ability to find the object of interest quickly if the image obtaining means loses track of the object of interest.

An object of interest may include, but is not limited to, an animal or robotic entity. For example, the image obtaining means may learn the entrances and exits of a defined space by tracking a human and recording each location where the camera loses track of the human. The places where the camera loses track of the human may be, for example, a door or entryway.

The machine readable instructions may cause the image obtaining means to further perform determining whether the predetermined object becomes found within the image periphery of the image data; and if the predetermined object becomes found, recording the coordinates of the pan-tilt camera in the memory module.

The image obtaining means may be configured to aggregate a first list including the recorded coordinates of the camera.

The image obtaining means may be configured to aggregate a second list by averaging the coordinates recorded in the first list within a predetermined range and prescribing a weight to each of the averaged coordinates; and prioritize the second list based on the prescribed weight of the averaged coordinates.

The image obtaining means may be configured to sequentially set the pan-tilt camera through the second list of coordinates until a predetermined object is detected if a predetermined object is not detected.

The image obtaining means may be configured to continuously update the first and second lists.

The image obtaining means may be configured to track the predetermined object using the pan-tilt camera if the predetermined object is moving.

The camera may be a RGB camera.

The camera may be an IR camera.

A tracking system comprising a plurality of image obtaining means according to the aforementioned image obtaining means.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles thereof.

BRIEF DESCRIPTION OF THE DRAWINGS

FIG. 5 is a table showing an example of a raw dataset accumulated by the exemplary image obtaining means; and FIG. 6 is a table showing an example of a processed dataset accumulated by the exemplary image obtaining means.

DESCRIPTION OF THE EMBODIMENTS

Reference will now be made in detail to exemplary embodiments of the disclosure, examples of which are illustrated in the accompanying drawings. Wherever possible, the same reference numbers will be used throughout the drawings to refer to the same or like parts.

Figure 1:
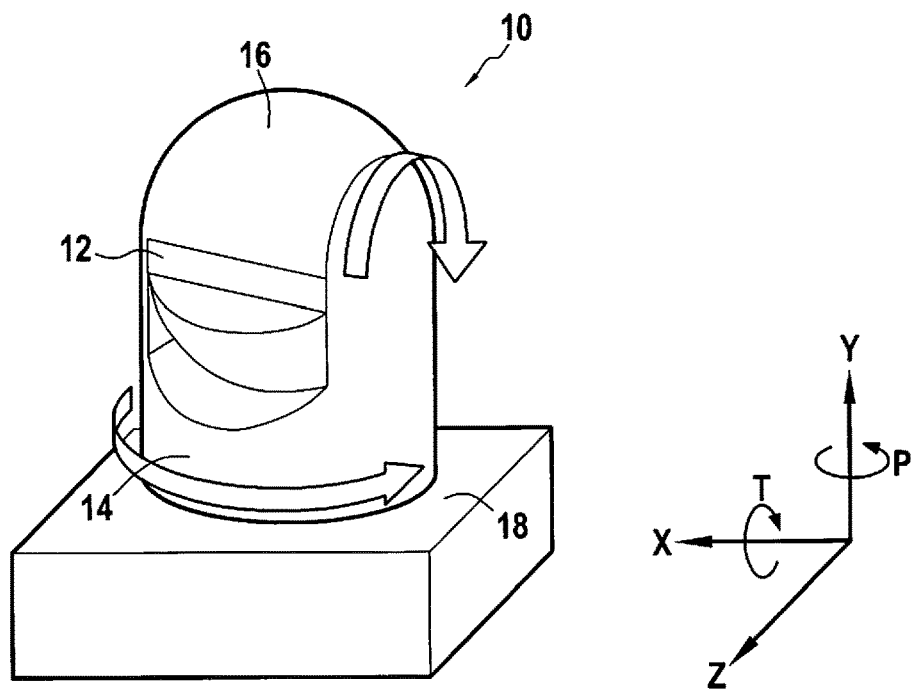
FIG. 1 shows the exterior of an exemplary image obtaining means according to embodiments of the present disclosure.

FIG. 1 shows an exterior of an exemplary image obtaining means 10 according to embodiments of the present disclosure. The image obtaining means 10 may include a camera 12. The camera 12 may be any suitable camera, for example a color camera or infrared camera. The image obtaining means 10 may be configured to pan, tilt, and zoom (PTZ) the camera 12, in particular a first rotatable portion 14 may be configured to rotate about a Y axis (pan) and a second rotatable portion 16 may be configured to rotate about a X axis (tilt) that is orthogonal to the Y axis. The image obtaining means 10 may include a base 18 that is configured to mount to a surface.

Figure 2:
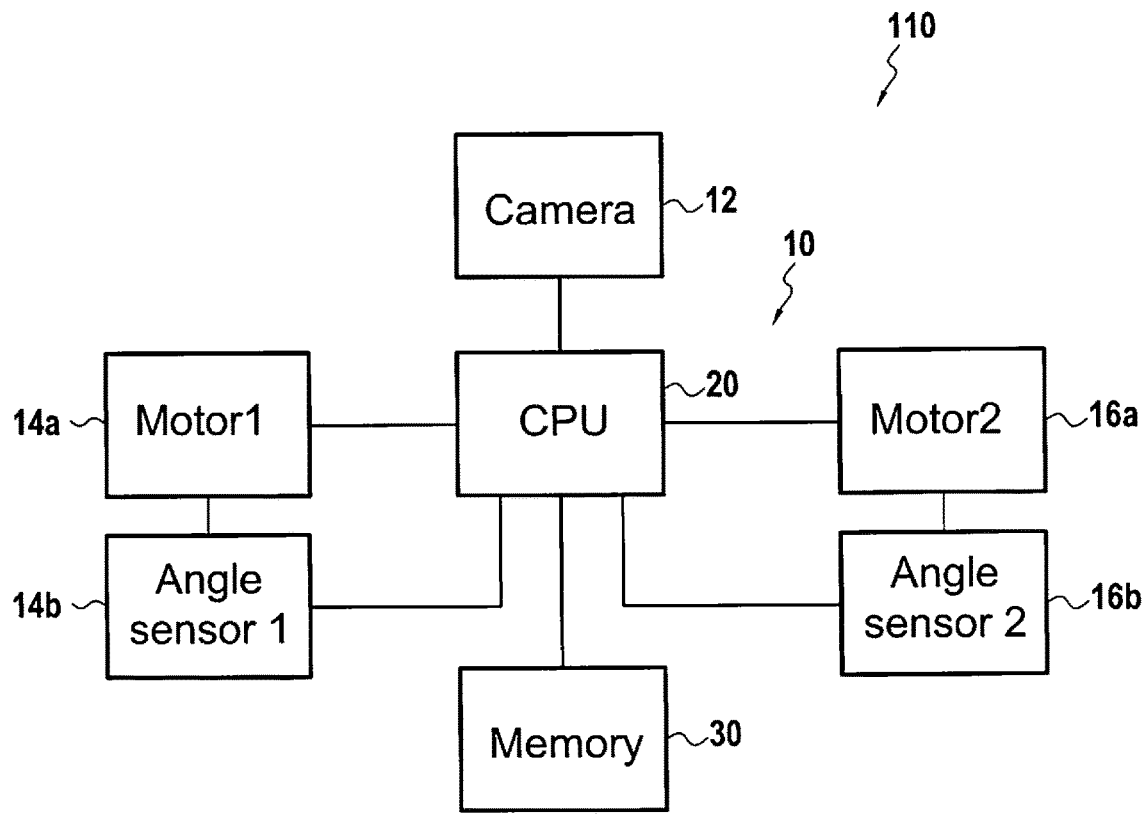
FIG. 2 is an illustration of a processing system of the exemplary image obtaining means.

Shown in FIG. 2 is an illustration of a processing system of the exemplary system. The image obtaining means 10 may include motors 14a, 16a to control the pan and tilt of the rotatable portions 14, 16, one or more angle sensors 14b, 16b, a processing means 20, such as a central processing unit (CPU), and memory 30, among others.

The image obtaining means 10 may be configured to process the data obtained from a defined space or predetermined area to aid in the execution of tracking an object of interest. Such image obtaining means 10 are known in the art, and one of skill in the art will understand that any such image obtaining means 10 may be implemented in the present system without departing from the scope of the present disclosure.

CPU 20 may be configured to manipulate data, perform calculations, and execute code, in order to carry out embodiments of the present disclosure. For example, determine that the predetermined objet is stationary, moving, aggregate a list, prioritize a list, execute a search protocol, etc. CPU 20 may be linked to one or more databases and/or other memory (e.g., RAM, ROM, etc.) associated with the image obtaining means 10 so as to enable storage of data related to the object of interest. One of skill in the art will recognize that information discussed herein with regard to any such databases and/or memory is not intended to be limiting.

CPU 20 may be configured to receive data from one or more angle sensors 14a, 14b. For example, CPU 20 may receive data regarding a status and/or position of the first and second motors 14, 16, among others.

The image obtaining means 10 may include one or more system controllers, which may be configured to receive information and/or commands from CPU 20, and to execute those commands to control the image obtaining means 10. For example, the controller(s) may position the first and second motors 14 and 16 to coordinates that are associated with a determined entrance/exit such that the camera 12 can find an object of interest.

Figure 3:
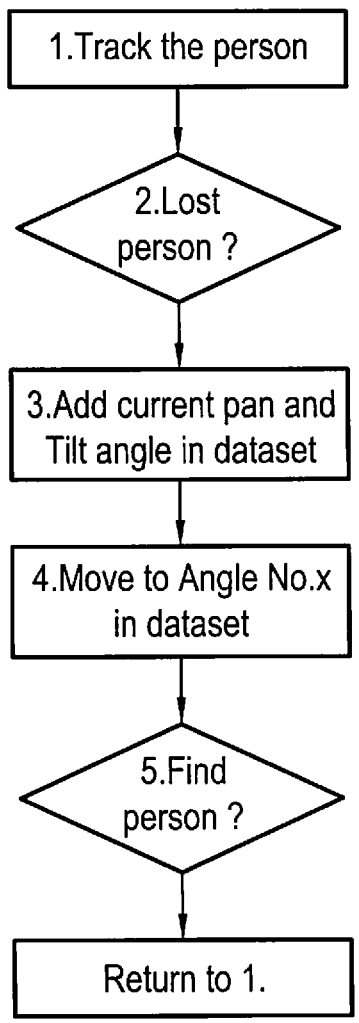
FIG. 3 is a flowchart showing an exemplary method according to embodiments of the present disclosure.

The flowchart of FIG. 3 showing an exemplary method according to embodiments of the present disclosure will be discussed along with the pictorials in FIGS. 4A-4D that demonstrate how the image obtaining means 10 operates.

Step 1

Figure 4A:
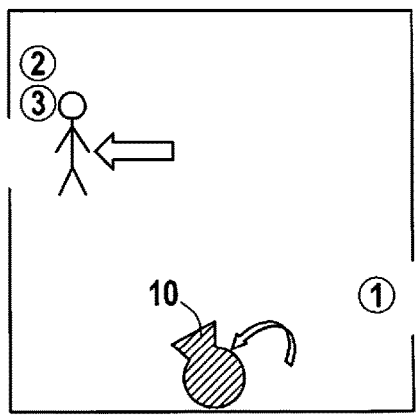
FIGS. 4A-4D are pictorials showing the operation of the exemplary image obtaining means.

According to embodiments of the disclosure, after the image obtaining means 10 finds an object of interest it is configured to track the object. This is shown in FIG. 4A.

Step 2

Next, the image obtaining means 10 determines whether the object is lost. This is shown in FIG. 4B.

Step 3

If it is determined that the object is lost, the image obtaining means 10 records the coordinates of the first and second motors read from the first and second angle sensors. This data is recorded and continually updated in the in the memory of the image obtaining means 10. These coordinates are aggregated into a raw dataset as shown in FIG. 5.

The raw dataset is then processed using a density based clustering method, for example, DBSCAN. The clusters that are formed by the acquired coordinates are assumed to be entrances/exits. Each cluster has a set of coordinates associated with it, wherein a single set of coordinates is the mean coordinates for that cluster. Each cluster is also assigned a location, e.g., ①, ②, ③, ④, etc.

The locations ①, ②, ③, ④ may be prioritized based on the number of instances the image obtaining means 10 loses an object of interest at the coordinates associated with a specific cluster or, thus, location. This processed and prioritized information is aggregated into a processed dataset, shown in FIG. 6.

As shown in FIGS. 4A-4D, locations ①, ②, ③, ④ are each determined to be an entrance/exit or a location where the object of interest, which is depicted as a person, has been lost form the field of view. In FIG. 6, the location ① has a higher priority than location ② which means that entrance/exit is used more frequently.

Step 4

Figure 4C:
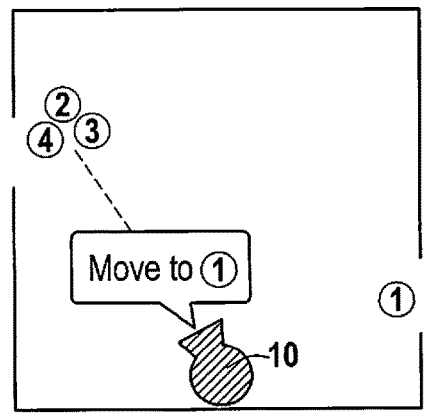
Figure 4B:
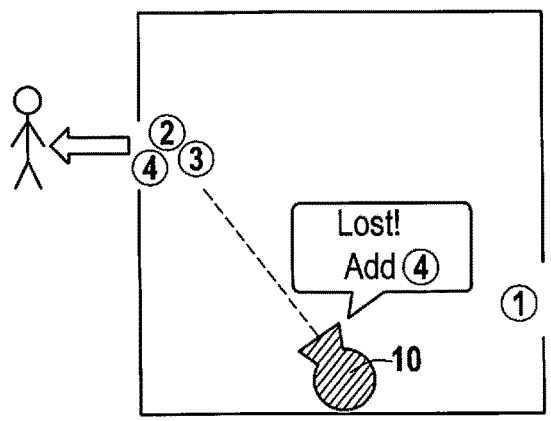
Figure 4D:
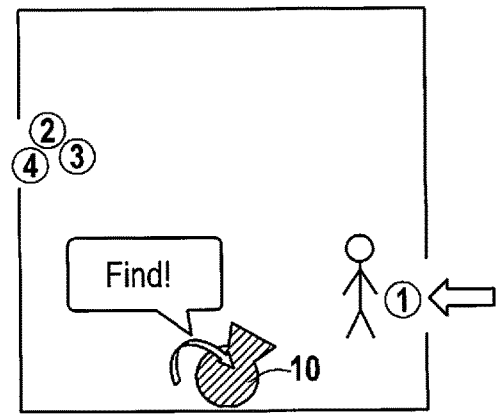

As depicted in FIG. 4C, if the object is not detected within the field of view or "lost", then the CPU executes a search protocol.

Step 5

The search protocol may use the processed dataset having assigned priorities to search for the object of interest at the top priority locations by orienting the image obtaining means 10 to the mean coordinates associated with that location. However, it is also contemplated that the image obtaining means 10 may search for the object of interest by sequentially orientating the image obtaining means 10, e.g., the pan-tilt camera 12, through the prioritized list of locations and associated mean coordinates until the object of interest is found.

Step 6

Once it is determined that an object of interest is found, the image obtaining means 10, e.g., the pan-tile camera 12, resumes tracking the object. An object of interest may be an assigned particular object, for example, an individual whose facial features are recorded in a facial recognition database. As such, the image obtaining means 10 may search for an individual. However, it is also envisioned that the object of interest may simply be any classification, for example, humans, dogs, robots, etc.

Although the present disclose has been discussed with reference to the image obtaining means 10, it is contemplated that several image obtaining means 10 may be configured to operate together as a tracking network or system. The tracking network may be linked together wirelessly.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. An image obtaining means comprising:
a processor;
a memory module communicatively coupled to the processor;
a pan-tilt camera including angle sensors communicatively coupled to the processor for tracking a predetermined object and sensing the coordinates of the pan-tilt camera; and
machine readable instructions stored in the memory module that cause the image obtaining means to perform at least the following when executed by the processor:
receiving, from the pan-tilt camera, image data including image periphery;
determining whether a predetermined moveable object is present based on the image data;
if the predetermined object is present, tracking the predetermined object with the pan-tilt camera;
determining whether the predetermined object becomes lost within the image periphery of the image data; and
if the predetermined object becomes lost, record the coordinates of the pan-tilt camera in the memory module where the predetermined has been tracked for the last time; wherein
the image obtaining means is configured to aggregate a first list including the recorded coordinates of the pan-tilt camera; and
the image obtaining means is configured to aggregate a second list by averaging the coordinates recorded in the first list within a predetermined range and prescribing a weight to each of the averaged coordinates; and prioritize the second list based on the prescribed weight of the averaged coordinates.

2. The image obtaining means of claim 1, wherein the machine readable instructions cause the image obtaining means to further perform determining whether the predetermined object becomes found within the image periphery of the image data; and if the predetermined object becomes found, recording the coordinates of the pan-tilt camera in the memory module.

3. The image obtaining means of claim 1, wherein the image obtaining means is configured to sequentially set the pan-tilt camera through the second list of coordinates until a predetermined object is detected if a predetermined object is not detected.

4. The image obtaining means of claim 1, wherein the image obtaining means is configured to continuously update the first and second lists.

5. The image obtaining means of claim 1, wherein the image obtaining means is configured to track the predetermined object using the pan-tilt camera if the predetermined object is moving.

6. The image obtaining means of claim 1, wherein the pan-tilt camera is a RGB camera.

7. The image obtaining means of claim 1, wherein the pan-tilt camera is an IR camera.

8. A tracking system comprising a plurality of image obtaining means according to claim 1.

* * * * *